US012574282B2

(12) United States Patent (10) Patent No.: US 12,574,282 B2
Hanciuta et al. (45) Date of Patent: Mar. 10, 2026

(54) NETWORK COMPONENT EVENTS WITH APPLICATION GRAPH DATA

(71) Applicant: Arista Networks, Inc., Santa Clara, CA (US)

(72) Inventors: Vlad Serban Hanciuta, Dublin (IE); Sundar Bettadahalli, Pleasanton, CA (US); Sandip Shah, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 55 days.

(21) Appl. No.: 18/611,510

(22) Filed: Mar. 20, 2024

(65) Prior Publication Data

US 2025/0300875 A1 Sep. 25, 2025

(51) Int. Cl.
H04L 41/0604 (2022.01)
H04L 43/022 (2022.01)
H04L 67/10 (2022.01)
H04L 69/22 (2022.01)

(52) U.S. Cl.
CPC ........ H04L 41/0604 (2013.01); H04L 43/022 (2013.01); H04L 67/10 (2013.01); H04L 69/22 (2013.01)

(58) Field of Classification Search
CPC ... H04L 41/0604; H04L 43/022; H04L 67/10; H04L 69/22
USPC ........................................................ 709/224
See application file for complete search history.

(56) References Cited

U.S. PATENT DOCUMENTS

| | | | | |
|---|---|---|---|---|
| 11,044,139 B1 * | 6/2021 | Farber | ................. | G06F 16/9024 |
| 11,212,195 B1 * | 12/2021 | Tamir | .................... | G06F 11/302 |
| 2005/0075075 A1 * | 4/2005 | Wechter | ................. | H04L 41/00 |
| | | | | 455/67.11 |
| 2013/0097183 A1 * | 4/2013 | McCracken | ........ | G06F 11/0709 |
| | | | | 707/E17.011 |
| 2017/0104658 A1 * | 4/2017 | Sykes | ................... | H04L 41/044 |
| 2020/0099709 A1 * | 3/2020 | Vasseur | .............. | H04L 43/0888 |
| 2021/0288951 A1 * | 9/2021 | Rose | ................... | H04L 63/0861 |

FOREIGN PATENT DOCUMENTS

WO WO-2020052741 A1 * 3/2020 ......... H04L 41/0604

* cited by examiner

*Primary Examiner* — Ruolei Zong
(74) *Attorney, Agent, or Firm* — Patent Capital Group

(57) ABSTRACT

Network events that disrupt networking devices are evaluated with respect to the impact of the events on particular applications communicating on the network. To associate applications with network events, a dependency graph is generated that associates individual applications with various components on which the application relies, which may include different hosts and virtual machines across a network. To associate the applications with particular networking devices, networking devices may inspect packets handled by the devices and determine related applications based on the components in the dependency graph. An impact score for an application relative to individual networking devices is determined based on the respective portion of packet traffic for the application handled by the networking devices. When an event disrupts a particular networking device, the impact score may then be used to determine the actual effect of the disruption on different applications.

20 Claims, 6 Drawing Sheets

| Application 1 Dependencies | |
|---|---|
| Component | Dependency Score |
| Virtual Machine 1 | 1 |
| Virtual Machine 2 | 1 |
| Virtual Control Environment 1 | 1 |
| Virtual Control Environment 2 | 1 |
| Host 1 | 1 |
| Host 2 | 1 |
| Networking Device 1 | .5 |
| Networking Device 2 | .5 |
| Networking Device 3 | .3 |
| Networking Device 4 | .6 |
| Networking Device 5 | .1 |

Identify Applications for Monitoring
600

Identify Packets Associated with Applications at Networking Devices
610

Associate Applications with Networking Devices with Dependency Score Based on Identified Packets
620

Determine Network Event Affecting a Network Device
630

Determine Impact Score for Application Based on Dependency Score
640

NETWORK COMPONENT EVENTS WITH APPLICATION GRAPH DATA

BACKGROUND

This disclosure relates generally to networking device management of distributed applications and particularly to network disruption events affecting distributed applications.

Distributed applications (e.g., cloud-hosted applications) are often instantiated on virtual machines on particular hosts and connect with various networking devices (e.g., switches) to communicate with applications that may be on other hosts across a network. Various network disruption events on the network may affect these applications, such as congestion, changing network topology (added or removed networking devices), downed links, and so on, that result in lost or delayed packets. These events can be one cause of reduced or ineffective application performance. However, determining what network disruption events affect which applications and to what extent is not apparent, causing challenges in effectively troubleshooting application performance problems and relating network events to application impacts.

BRIEF DESCRIPTION OF THE DRAWINGS

FIG.

FIG. 4 shows an example table of dependency scores for one application based on a dependency graph, according to one embodiment.

Figure 1:
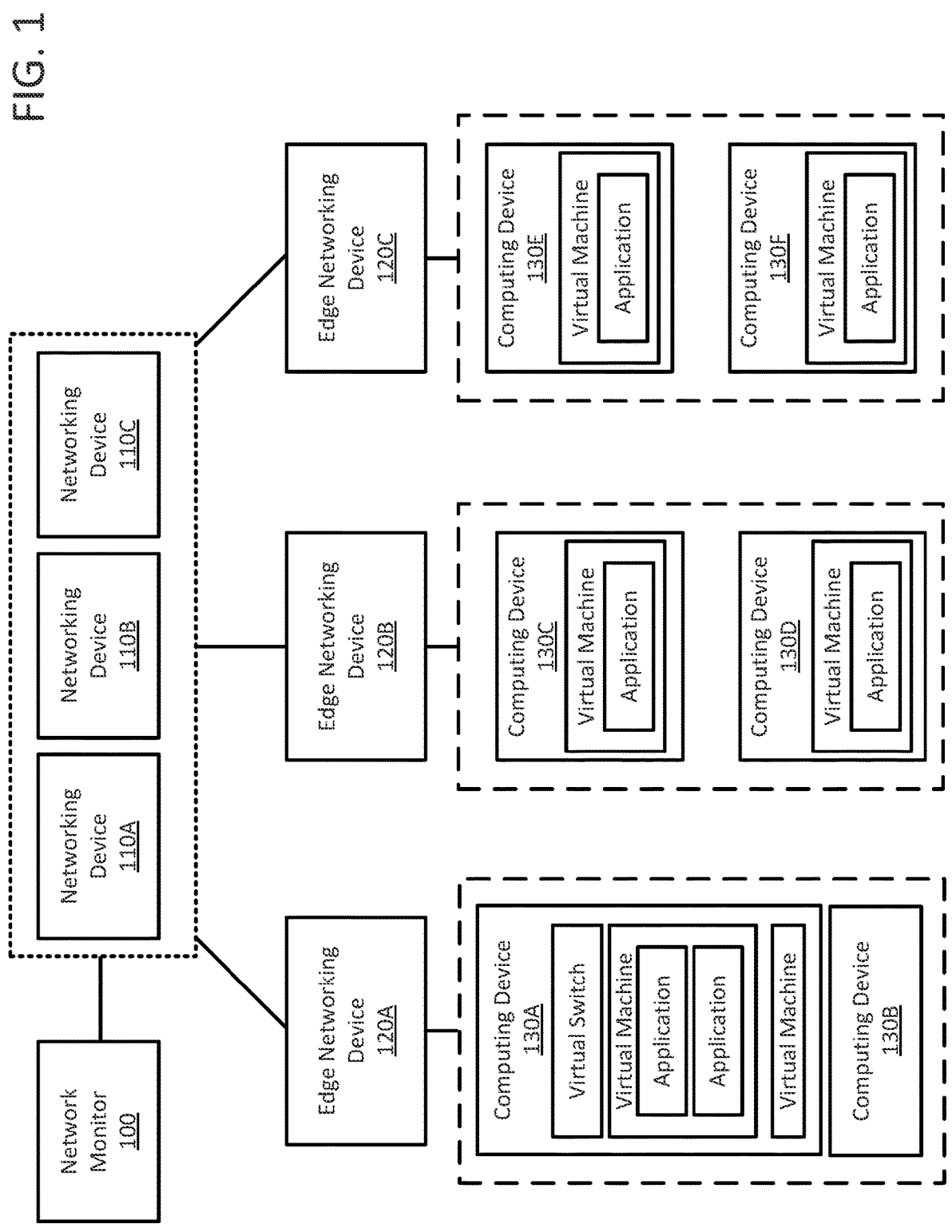
(FIG. 1 shows an example networking environment in which networking devices transfer information in a network, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

To relate networking components and related events to applications, a network monitor generates a dependency graph describing relationships of applications to various components. The dependency graph may describe the various networking components used by the application, which may include physical and virtual aspects of the application configurations. The dependency graph may describe, for example, that an application executes on a virtual machine of a particular host device and is connected to a particular virtual and physical switch on a networking device (e.g., a leaf node in the network). Communications pathways and associated devices used by the application are also described in the dependency graph, such as the various connections and networking devices one application uses to communicate with another application.

The dependency graph is constructed by determining the applicable applications and then populating networking dependencies based on the communication between the applications. Applicable applications may be determined from an application manager (e.g., that instantiates and manages virtual machine (VM) and application instances). The networking dependencies may be determined by monitoring (e.g., sampling) packet traffic and determining source and destination applications for packets passing through the networking devices. The dependency graph may also reflect changing communication frequencies across time as different applications may use resources at different rates at different times.

Events affecting communications on the network may then be associated with various applications and the expected impact of those events on the applications based on the dependency graph. When events occur that affect networking devices, the events may then be associated with (e.g., labeled with) related applications based on the dependency graph. Particular events, and optionally, clusters of events, may then be evaluated with respect to the affected applications. How events affect particular applications is characterized as an impact score that is determined based on the dependency of the application on the network components affected by the event. That is, the same event occurring at the same device may have different impact scores for different applications or the same application on different devices of the same type based on the dependency of the respective applications. The impact scores reflecting current network conditions can be used to characterize effects on an application from multiple events across different parts of the network. This also enables network health metrics to evaluate and consider application-level impacts of network conditions. The overall health metrics or individual impact scores may then be used to modify application deployment or modify networking configurations.

System Environment

FIG. (FIG. 1 shows an example networking environment in which networking devices 110A-C transfer information in a network, according to one embodiment. The networking devices and related processes discussed herein may also be applied to different networking configurations and architectures, such that the particular arrangement shown in FIG. 1 shows one example architecture in which these approaches may be applied. In general, the networking devices 110A-C and edge networking devices 120A-C provide various network switching and routing services between various computing devices 130A-F and may provide networking services with L2 and/or L3 network addressing (e.g., including handling with Media Access Control (MAC) and Internet Protocol (IP) addresses). The different computing devices 130A-F communicate with packets including a payload for delivery and header information describing various information for handling processing of the packet during network communication, which may include information about the source, destination, sequence information, priority information, data type, and so forth.

In the environment of FIG. 1, each edge networking device 120A-C is connected to one or more computing devices 130A-F. The connected computing devices 130 of each edge networking device 120 represent the local computing devices for the respective edge networking device 120. In this example, the computing devices 130A-B are connected locally (i.e., directly) to edge networking device 120A, computing devices 130C-D to edge networking device 120B, and computing devices 130E-F to edge networking device 120C. The networking devices (including networking devices 110A-C and edge networking devices 120A-C), may be configured in various networking architectures, such as a spine and leaf architecture in which each edge networking is a "leaf" device that connects to other leaf devices via a set of spine networking devices (e.g., via networking devices 110A-C). Additional networking devices (not shown) may be included in various architectures and provide further switching and forwarding for data related to the computing devices 130A-F. As another example, the edge networking device 120 may also be a "top-of-rack" device connected to a group of computing devices 130 on a server rack and provides a connection to other devices at other racks in a data center, across different data centers, or across a broader network (e.g., the Internet). The edge networking devices 120 may thus be physically remote from one another (such as edge networking device 120A relative to edge networking device 120C) and accessible via various intermediate communication links and further networking devices.

Each edge networking device 120 provides networking services for communication with other devices across the overall network (e.g., to and from computing devices 130 connected to other edge networking devices 120). For example, edge networking device 120A may receive packets from computing device 130B for delivery to computing device 130E via edge networking device 120C.

Each of the computing devices 130, which may also be referred to as a "computing host" or as a "host," executes one or more applications that generally provide various services to internal and/or external clients. For example, the applications may provide services as part of a cloud computing platform, such that individual hosts instantiate application instances performing the particular service of the instantiated application. As example services, the applications may perform frontend login and client interface services, database management/access, and backend data processing services. The various applications may communicate with one another and with external systems (e.g., client devices) during execution of the applications. In addition, at different times and under different loads different computing hosts may operate different applications in different quantities. That is, the applications may be dynamically assigned to computing devices 130, instantiated, and have varying communications with different devices over time. For example, a particular application providing frontend connections to client devices may have varying demands within a day and across a week, such that the amount of activity and number of instances of the application may differ over time.

In some embodiments, the computing devices 130 may execute a virtual machine or other virtualized environment for executing application(s) on the network. In some instances, individual computing devices 130 may instantiate multiple virtual machines, each of which may execute one or more applications (i.e., an instance of the application executing within the computing device). A virtual switch or other supervisory environment within the computing device 130 may be responsible for managing networking associations and assignments of the individual virtual machines and/or applications on the computing devices 130. For example, virtual machines may be assigned a VLAN, layer 2 (e.g., Media Access Control (MAC)) or layer 3 (e.g., Internet Protocol (IP)) addresses and other configurations for communication with other applications across the network and with external devices across additional networks (e.g., at external networks). These functions may be coordinated with the virtual switch operating on the computing device 130. In some embodiments, the virtual switch may also operate as a hypervisor or other supervisory environment for spawning virtual machines and/or applications on the computing device and coordinating application instances across different computing devices (e.g., locally or across the network).

A network monitor 100 monitors performance of the various applications across the network. In particular, the network monitor 100 identifier may generate one or more network dependency graphs to associate particular applications with other components on the network (e.g., hosts, virtual machines, and network devices) and determine impact scores describing the relationship between a particular application and a particular component (e.g., the significance of a particular networking device on the operation of a particular application). The components may include computing components and networking components. The computing components indicate particular components that may perform operations on a computing device, such as the host device or virtual machine. The networking components refer to various networking devices, such as networking devices 110 and edge networking devices 120 that convey packets across computing devices 130 in the network.

When events occur on the network that impact operation of a component, the network monitor 100 may use the impact score to determine the effect of the event with respect to the particular application as a whole (e.g., the services provided by that application). As discussed more fully below, the network monitor 100 may gather information from the various devices, including networking devices such as networking devices 110 and edge networking devices 120 to determine the relationship between devices and the application, along with the overall current impact of conditions on operation of applications.

To associate networking activity with individual applications and assess the effect of networking events (e.g., events that disrupt service by networking devices), the network monitor 100 generates a dependency graph that relates particular applications to various components. For a particular networking device, the dependency of an application on that device may be based on the extent to which traffic for an application is carried by the networking device. However, traffic is typically not organized at the application level within the network, and individual packets handled by the networking devices generally does not expressly indicate which application sent or will receive the packet.

To associate activity at networking devices with particular applications, first, application relationships to particular computing components (e.g., virtual machines and computing devices) are determined; second, those relationships are used to relate monitored traffic at networking devices with particular applications. Thus, a dependency graph may be generated in two phases, first related to computing components of the computing devices 130, and second related to particular networking devices (e.g., networking devices 110 and edge networking devices 120).

Dependency Graph

Figure 2:
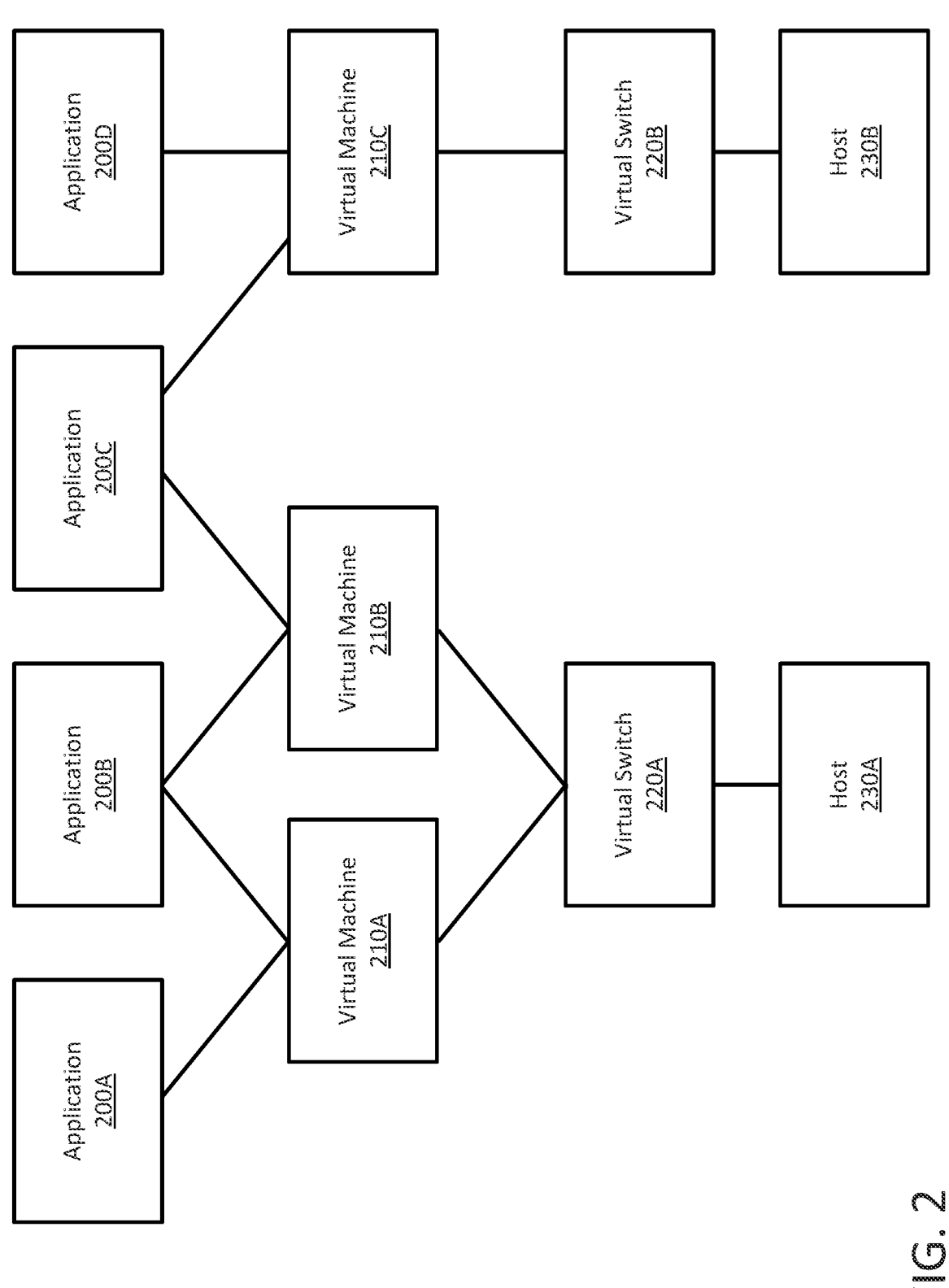
FIG. 2 shows an example dependency graph, according to one embodiment.

FIG. 2 shows an example dependency graph, according to one embodiment. The dependency graph maps particular individual applications 200A-D to particular components associated with executing the applications. The dependency graph shown in FIG. 2 provides dependency information for a group of applications 200A-D that are hosted on two physical computing devices, labeled as hosts 230A-B. The dependency graph shown in FIG. 2 may relate to various components associated with the individual computing devices on which the applications 200A-D execute. Additional computing components shown in FIG. 2 include virtual machines 210A-C and virtual switches 220A-B. In some embodiments, a dependency graph such as the example of FIG. 2 is determined to describe relationships between applications and computing components.

Each application 200A-D represents a particular type of application that may be executed by one or more computing devices in conjunction with one or more computing components. Each connection in the dependency graph may represent the computing components associated with executing one or more instances of the respective applications 200A-D. As discussed above, there may be a number of computing components related to executing an application on a host 230A-B, in this example including virtual switches 220A-B and virtual machines 210A-C. In the example of FIG. 2, application 200A is associated with an instance executing in virtual machine 210A that is managed by virtual switch 220A on host 230A. Similarly, application 200D has an instance executing in virtual machine 210C managed by virtual switch 220B on host 230C.

In this example, application 200B is associated with one instance on virtual machine 210A and another instance on virtual machine 210B. Although both may execute on the same computing host, by identifying the separate virtual machines, events that affect particular virtual machines may be separately identified and associated with the effects on application 200B. Similarly, application 200C has an instance executing on virtual machine 210B, associated with host 230A, and another instance on virtual machine 210C, associated with host 230B.

To determine the dependency graph, the relationships between components may be reported to the network monitor 100 by various of the computing components or by a supervisory environment of the computing device. For example, when an instance of an application is spawned for instantiation at a host, the instantiated application and related network configuration may be reported to the network monitor. In additional embodiments, the host, virtual switch, and/or virtual machine report instantiated applications and related networking configurations of the applications to the network monitor. In some configurations, the reporting may be performed with additional reporting and/or control functionality instrumented in the respective component(s).

The networking configurations may include various parameters of packets transmitted on the network that originate from or are destined for a particular application. Such networking configurations may include any type of parameter that may be specified in a packet header, such as a layer 2 or 3 address, a layer (Internet Protocol) address, layer 3 (Media Access Control), a virtual local area network (VLAN) identifier, and any other tags or labels that may be associated with packets of the application. As such, the network monitor gathers information about the configured computing components and network characteristics of the various applications 200A-D. The networking configuration(s) associated with instances of the application may then be used to associate network traffic at individual networking devices with particular applications.

Figure 3:
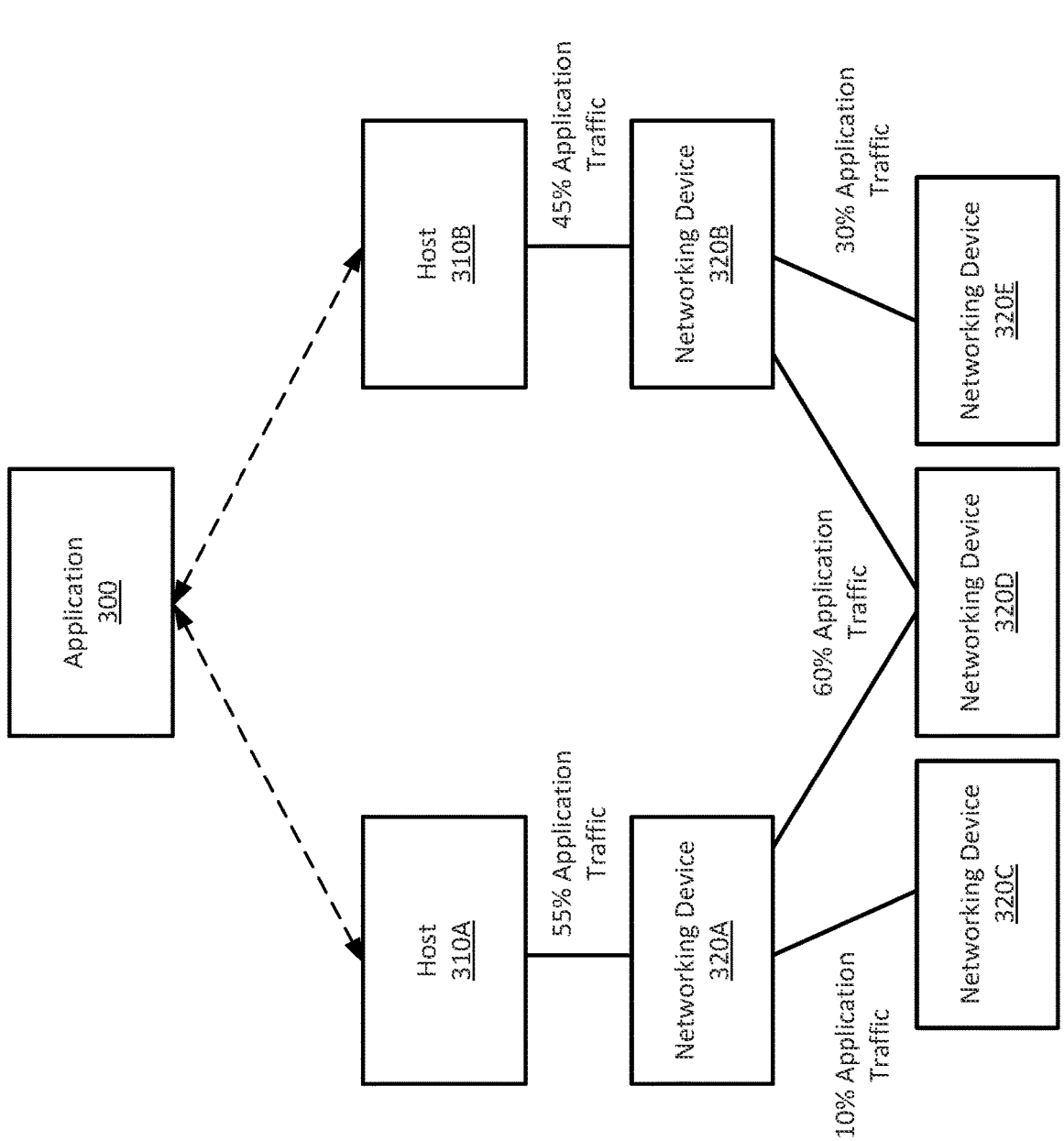
FIG. 3 shows an example of a dependency graph for an application including a group of networking devices, according to one embodiment.

FIG. 3 shows an example of a dependency graph for an application 300 including a group of networking devices 320A-E, according to one embodiment. The application 300 is shown here as associated with hosts 310A-B and may be associated with additional computing components as shown in FIG. 2. Using the network characteristics associated with the application and/or computing components, packets that travel through the networking devices 320A-E are determined as associated with the application 300 to determine an impact score for each networking device 320A-E with respect to the application 300.

To associate packets with an application, the network characteristics (e.g., associated with particular instances of the application) are compared with packet header(s) of the packet. For example, a particular instance of the application may be associated with a particular combination of network address, port, MAC address, and so forth, according to how packets to the application are labeled in the network. Packets handled by the networking devices are analyzed for relevant networking characteristics (e.g., source or destination addresses) and matched with relevant applications to determine the impact score. To match the application, the relevant packet headers are compared, either at the networking device or at the network monitor, to networking characteristics of an application. To determine a quantity of packets for each device, the packets associated with the application may then be accumulated across a period of time, such as a minute or five minutes. In some embodiments, rather than evaluate all packets handled by the networking devices, the packets may be sampled to determine associated applications for a portion of packets and then extrapolated to indicate a total quantity in the time period.

In some embodiments, the impact score for a particular networking device 320 is determined based on a portion of traffic related to the application that is processed by that networking device. After packets passing through each networking device are analyzed to associate packets with particular applications, the number of packets associated with a particular application at each networking device is determined. Depending on the network topology and distribution of the application instances, different networking devices may carry different amounts of traffic for the application. The example of FIG. 3 may represent a leaf and spine configuration in which the networking devices 320A-B are edge networking devices directly connected to the computing hosts, and networking devices 320C-E are intermediate network devices between edge networking devices. In this circumstance, the network traffic for the particular application may travel to at least one edge networking device and one intermediate networking device associated with the application 300. As such, each packet sent or received by the application 300 may be handled by more than one of the networking devices 320A-E.

To determine an impact score for a particular networking device, the packets associated with the networking device may be evaluated relative to the packets associated with other networking devices. In one embodiment, the impact score may be an estimated portion of network traffic carried by the networking device. The portion may be based on a grouping of the devices, such that edge networking devices and intermediate networking devices are evaluated separately. In this example, the impact scores for networking devices 320A-B may be determined with respect to the portion of traffic for each device in the group. In this example, 55% of the application traffic is handled by networking device 320A and 45% by networking device 320B. Similarly, the impact scores for networking devices 320C-E may be evaluated based on the portion of traffic for each device in that group.

As another example, the portion of traffic may be evaluated for each device based on the relative amount of traffic carried by the device compared to the combined traffic for all devices. In some embodiments, the impact scores are normalized, such that the networking device having the highest number of packets for an application has a designated impact score value (e.g., a value of 1), and other networking devices have an impact score determined as a fraction of the designated impact score corresponding to a fraction of packets associated with that device. As reflected in FIG. 3, a particular networking device (e.g., networking device 320D) may also process packets from multiple application instances, such that the total dependency score may capture packets relating to the application as a whole (i.e., including packets matched to network characteristics associated with an application instance of host 310A and an application instance of host 310B).

FIG. 4 shows an example table 400 of dependency scores for one application based on a dependency graph, according to one embodiment. The table 400 shows an example of the dependency scores for the various components determined with respect to the application. In this example, the dependency scores for the computing components have a dependency score of 1, indicating that events affecting these components directly affect the application performance. For the networking components, the scores may differ based on the amount of traffic handled by the networking devices. As discussed further below, information about applications may be displayed to users as a part of an application monitoring service. The table 400 or similar may be shown to a user to aid in evaluating dependency relationships for the application on different components.

The dependency of an application on various components may vary across time. For example, the application may experience different loads, different computing components may be used to execute the application, and different portions of the network may carry different amounts of traffic related to the application. As such, the dependency graph and/or dependency scores may be re-generated from time to time to capture changes in dependency. In addition, historical scores may be used to predict future dependencies. For example, an application may be monitored over time and analyzed with respect to time of day to determine historical dependencies on a particular networking device tend to increase at one time of day and decrease at another. These time-related dependencies may then be used to analyze potential errors or risks to effective use of the application or may be used to mitigate risks of over-dependence on any particular networking device.

The relationships between components and applications determined with the dependency graph may then be used to effectively relate events on the network to impacts on specific applications.

Figure 5:
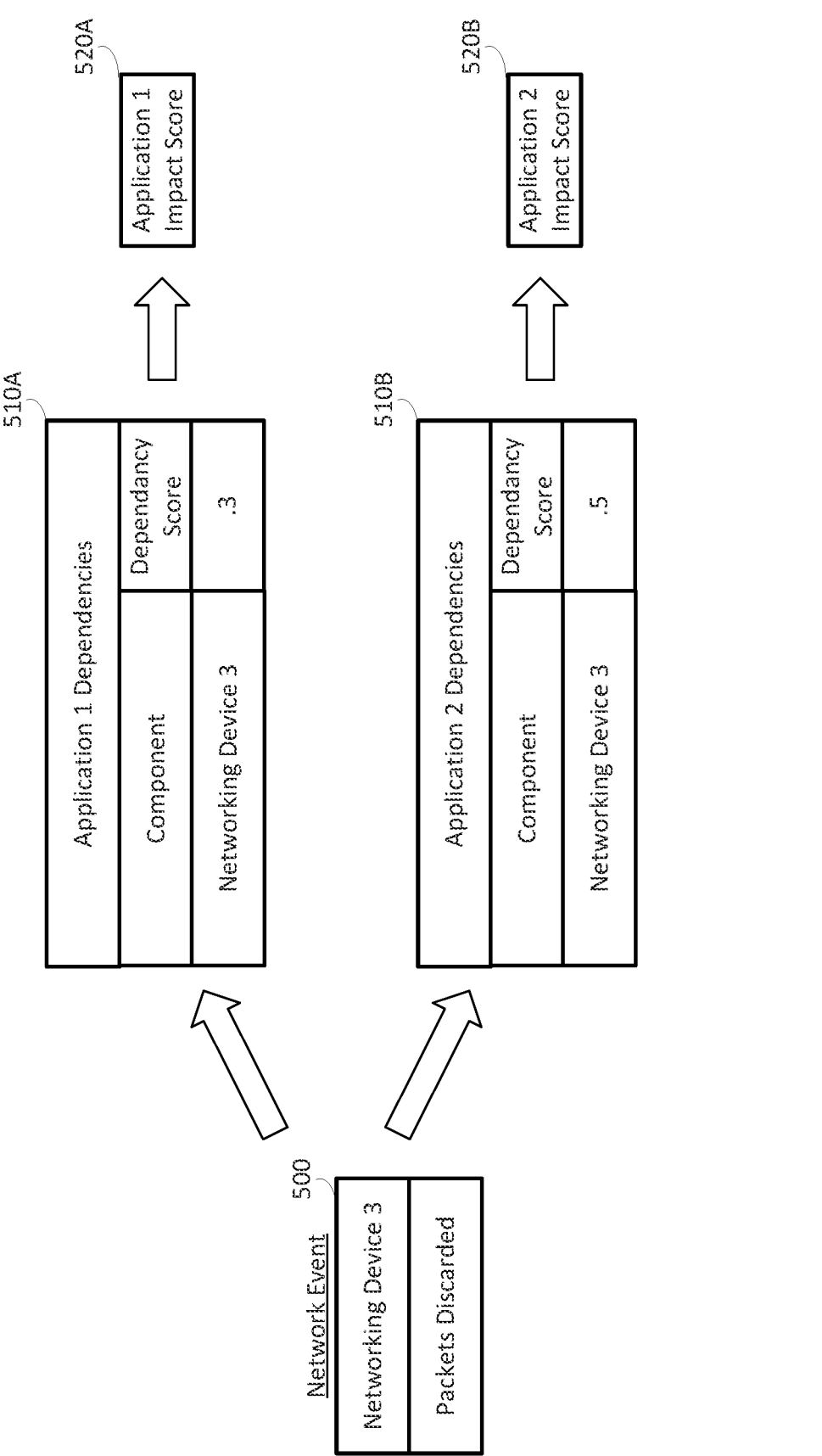
FIG. 5 shows an example for relating a network event to an impact score for related applications, according to one embodiment.

FIG. 5 shows an example for relating a network event 500 to an impact score 520 for related applications, according to one embodiment. When disruptions occur on the network, network events may be identified and reported to the network monitor. When the network monitor receives a network event 500, the network monitor may retrieve the associated node in the dependency graph or otherwise identify the dependency scores 510A-B for applications associated with the related computing device. In this example, the network event 500 indicates that packets were discarded at networking device 3, which may indicate that the networking device is experiencing excess incoming traffic or otherwise cannot clear its packet queues faster than packets are received. The dependency scores 510A-B may then be used to determine respective impact scores 520A-B for the different applications. In this example, a first application has a lower dependency score (0.3) than a second application's dependency score (0.5). Events that affect this networking device are expected to impact overall operations of the first application less than the second application. As such, the impact score 520A for application 1 is typically lower than the impact score 520B for application 2. The impact score may be determined in various ways and may be a combination of a severity of the networking event and the dependency score.

In some embodiments, each type of networking event is associated with a different severity, which may be represented as a separate numerical value. As such, more severe events, such as the networking device failing to transfer any packets (e.g., the device going offline) may be more severe than the networking device having a reduced throughput or sporadic packet loss (e.g., discarding a portion of packets to maintain other packet transfer). The impact scores 520 may thus be the combination of the severity score of the network event type and the impact score for that application.

Figure 6:
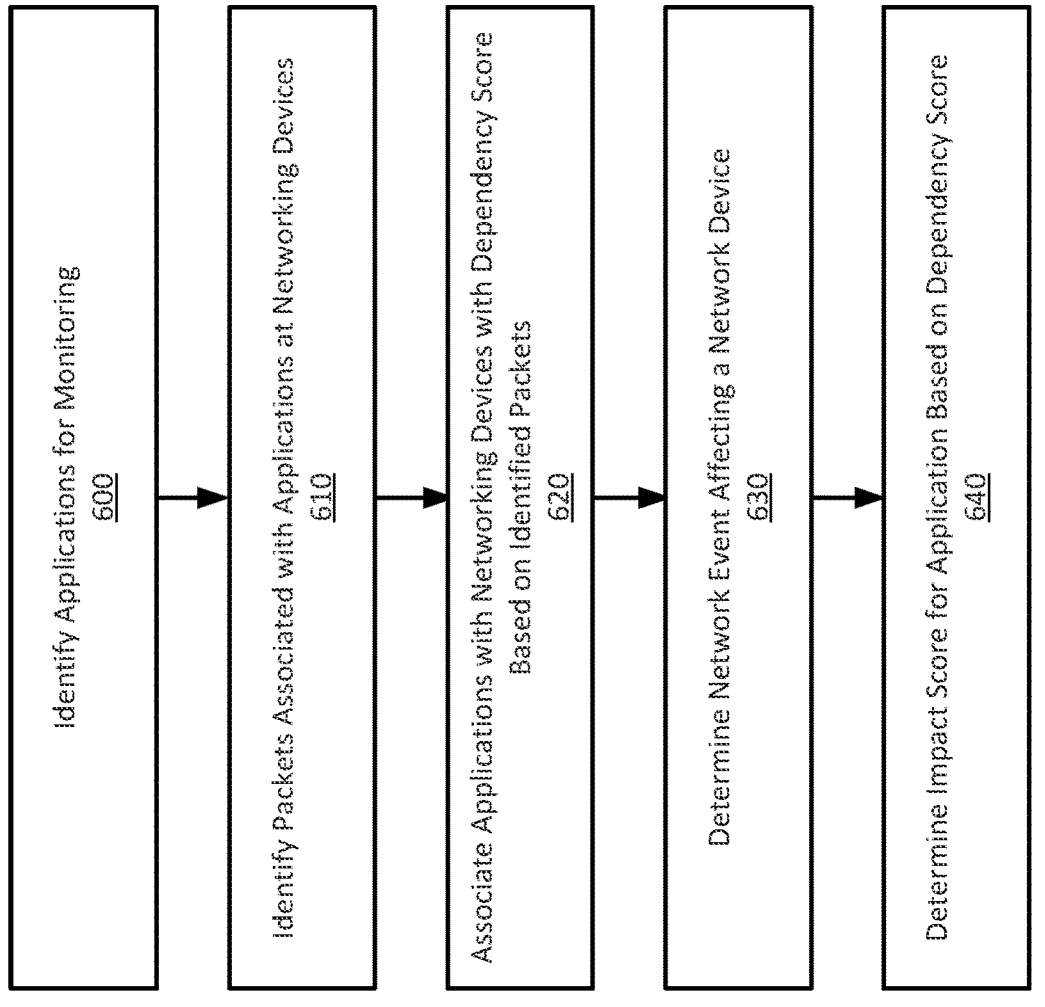
FIG. 6 shows an example process for evaluating network events with respect to applications based on a dependency graph, according to one embodiment.

FIG. 6 shows an example process for evaluating network events with respect to applications based on a dependency graph, according to one embodiment. The steps of FIG. 6 may generally be performed by a network monitor in conjunction with the networking devices and computing hosts. As discussed above, initially, a dependency graph may be generated by identifying 600 one or more applications to be monitored and identifying the computing components associated with the applications, along with network characteristics associated with the applications. The network characteristics may then be used to identify 610 packets associated with an application as networking devices process packets. As discussed above, each networking device may monitor and/or sample packets and compare packet information (e.g., header information) with networking characteristics of the application to associate packets with the application, from which a dependency score of the application on the networking device can be determined and associated 620 with the networking device in the dependency graph.

As such, the dependency graph and related dependency scores for applications can be used to relate disruptive networking events with particular applications. When a networking event is determined 630, the affected networking device is determined (e.g., as may be specified in the networking event or otherwise determined from the related networking information) so that the affected device can be related to relevant applications in the dependency graph. Using the dependency scores and type of networking event, the impact score for the affected applications is determined 640 to describe the overall impact of the networking event on the application. Although the applications may be distributed across different computing devices, a relationship between the networking device and the application may be determined using the dependency graph and related scores.

In further embodiments, the impact scores for various events may then be compared to help users identify the highest-impact events on application performance, guiding the user to which networking devices may most affect poor application performance. For example, the impact scores for various network events related to an application may be ranked to indicate the severity, with respect to a specific application, of the various events on the network. In some instances, a relatively less severe network event may have a higher impact score on a particular application because that application is highly dependent on that networking device. By determining this dependency based on actual traffic of applications through the networking device, administrators may prioritize addressing network events according to actual impact on particular applications. In further embodiments, the impact scores for various events may be combined to an overall health score for the application with respect to the network events. The health score and individual impact scores may also be provided to a network administrator to review and address network events as related to particular applications. As the dependency scores may also be updated over time and account for changing conditions, this data also provides real-time information to the administrator for diagnosing and addressing application performance.

The dependency and/or impact scores may then be used to take various actions the modify the dependency of an application with respect to a networking component or address network events based on the impact score of the networking event with respect to an application. For example, the dependency score may be monitored and used to modify where instances of an application are instantiated, or the impact score may be used to triage or otherwise prioritize interventions related to different applications. These may be performed by a network administrator or in some embodiments may be automatically implemented by the network monitor or an application manager. The dependency score for a particular networking device may be used to modify where instances of the application are instantiated, such that the reliance of the application on a particular networking device may be reduced. For example, when the load for an application exceeds a threshold for spawning a new instance of the application, the application manager may select a host/virtual machine for the instance based at least in part on the dependency score of the application. Similarly, existing instances may be moved or pruned based on the dependency score.

Likewise, when an impact score is determined for one or more applications, the impact score(s) may be used to automatically perform actions to remedy the event effects. For example, the applications may be relocated or instantiated at other computing devices when the impact score exceeds a threshold. As another example, the configuration of networking devices may be modified to prioritize or re-route traffic based on the impact score of the application, such that applications significantly (or more significantly) affected by the networking event may be prioritized in responsive networking configurations. As another example, the impact scores may be sorted for multiple applications and used to triage or otherwise prioritize responses for the applications by allocating resources (especially when limited or scarce) in order according to the impact scores (i.e., allocating resources first to applications having higher impact scores). For example, beneficial network configurations (e.g., traffic prioritization) or additional application instances may be preferentially provided to an application with a relatively high impact score before another application with a relatively low impact score.

The foregoing description of the embodiments of the disclosure has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for monitoring networking devices, comprising:

identifying a set of applications executing at a plurality of hosts that communicate across a plurality of networking devices in a network;

identifying a plurality of packets associated with one or more applications and one or more of the plurality of networking devices;

associating each of the set of applications with at least one of the plurality of networking devices in a dependency graph with a dependency score based on the plurality of packets;

determining a network event affecting communication for an affected networking device; and determining an impact score for an affected application based on the dependency score between the affected application and the affected networking device in the dependency graph.

2. The method of claim 1, wherein identifying the plurality of packets comprises sampling packets by the plurality of networking devices and associating sampled packets with the one or more applications based on packet header inspection.

3. The method of claim 2, wherein the packet header inspection includes associating sampled packets with an application based on source address, destination address, tag, or hostname of packet headers.

4. The method of claim 1, wherein the dependency score for the affected application with respect to the affected networking device is based on a portion of the packets associated with the applications that are handled by the affected networking device.

5. The method of claim 4, wherein the dependency score for the affected networking device with respect to the affected application is based on packets associated with different instances of the affected application at different computing hosts.

6. The method of claim 1, wherein the impact score is also based on an event type of the network event.

7. The method of claim 1, further comprising:
    detecting one or more additional network events;
    determining an impact score for the one or more additional events with respect to the affected application; and
    ranking the network event and one or more additional networking events based on the impact score for the application.

8. The method of claim 1, further comprising:
    detecting one or more additional network events at another affected networking device;
    determining one or more additional impact scores for the one or more additional events with respect to the affected application; and
    determining a network health score for the affected application based on the impact score and the one or more additional impact scores.

9. The method of claim 1, further comprising providing the impact score for the event for display on a user interface.

10. A non-transitory computer-readable medium comprising instructions for execution by a processor for:
    identifying a set of applications executing at a plurality of hosts that communicate across a plurality of networking devices in a network;
    identifying a plurality of packets associated with one or more applications and one or more of the plurality of networking devices;
    associating each of the set of applications with at least one of the plurality of networking devices in a dependency graph with a dependency score based on the plurality of packets;
    determining a network event affecting communication for an affected networking device; and
    determining an impact score for an affected application based on the dependency score between the affected application and the affected networking device in the dependency graph.

11. The non-transitory computer-readable medium of claim 10, wherein identifying the plurality of packets comprises sampling packets by the plurality of networking devices and associating sampled packets with the one or more applications based on packet header inspection.

12. The non-transitory computer-readable medium of claim 11, wherein the packet header inspection includes associating sampled packets with an application based on source address, destination address, tag, or hostname of packet headers.

13. The non-transitory computer-readable medium of claim 10, wherein the dependency score for the affected application with respect to the affected networking device is based on a portion of the packets associated with the applications that are handled by the affected networking device.

14. The non-transitory computer-readable medium of claim 13, wherein the dependency score for the affected networking device with respect to the affected application is based on packets associated with different instances of the affected application at different computing hosts.

15. The non-transitory computer-readable medium of claim 10, wherein the impact score is also based on an event type of the network event.

16. The non-transitory computer-readable medium of claim 10, wherein the instructions are further executable for:
    detecting one or more additional network events;
    determining an impact score for the one or more additional events with respect to the affected application; and
    ranking the network event and one or more additional networking events based on the impact score for the application.

17. The non-transitory computer-readable medium of claim 10, wherein the instructions are further executable for:
    detecting one or more additional network events at another affected networking device;
    determining one or more additional impact scores for the one or more additional events with respect to the affected application; and
    determining a network health score for the affected application based on the impact score and the one or more additional impact scores.

18. The non-transitory computer-readable medium of claim 10, wherein the instructions are further executable for providing the impact score for the event display on a user interface.

19. A computer program product comprising a non-transitory computer-readable storage medium having instructions encoded thereon that, when executed by a processor, cause the processor to:
    identify a set of applications executing at a plurality of hosts that communicate across a plurality of networking devices in a network;
    identify a plurality of packets associated with one or more applications and one or more of the plurality of networking devices;
    associate each of the set of applications with at least one of the plurality of networking devices in a dependency graph with a dependency score based on the plurality of packets;
    determine a network event affecting communication for an affected networking device; and
    determine an impact score for an affected application based on the dependency score between the affected application and the affected networking device in the dependency graph.

20. The computer program product of claim 19, wherein identifying the plurality of packets comprises sampling packets by the plurality of networking devices and associating sampled packets with the one or more applications based on packet header inspection.

* * * * *